(12) United States Patent
Caruba et al.

(10) Patent No.: US 6,965,110 B2
(45) Date of Patent: Nov. 15, 2005

(54) HIGH VOLTAGE DISTRIBUTION FOR A RADIOGRAPHIC SENSOR DEVICE

(75) Inventors: James F. Caruba, Bartlett, IL (US); Fred E. Macciocchi, Huntley, IL (US); George W. Dailey, Glen Ellyn, IL (US); John P. Valenta, Machesney Park, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 09/985,901

(22) Filed: Nov. 6, 2001

(65) Prior Publication Data

US 2005/0145799 A1    Jul. 7, 2005

(51) Int. Cl.[7] ................................................. G01T 1/20
(52) U.S. Cl. .............................. 250/370.01; 250/370.09
(58) Field of Search ....................... 250/370.01, 370.04, 250/370.09, 370.1; 439/65, 66

(56) References Cited

U.S. PATENT DOCUMENTS

| | | | |
|---|---|---|---|
| 4,292,645 A | | 9/1981 | Schlosser et al. |
| 4,922,376 A | * | 5/1990 | Pommer et al. ............ 361/715 |
| 5,132,542 A | | 7/1992 | Bassalleck et al. |
| 5,727,954 A | * | 3/1998 | Kato et al. .................... 439/66 |
| 5,786,597 A | * | 7/1998 | Lingren et al. ........ 250/370.09 |
| 6,236,051 B1 | * | 5/2001 | Yamakawa et al. ...... 250/370.1 |
| 6,340,818 B1 | * | 1/2002 | Izumi et al. ........... 250/370.13 |
| 6,359,281 B1 | * | 3/2002 | Pawlak et al. ......... 250/370.09 |
| 6,388,258 B1 | * | 5/2002 | Berlad et al. .......... 250/363.07 |
| 6,472,668 B1 | * | 10/2002 | Griesmer et al. ...... 250/370.13 |

* cited by examiner

*Primary Examiner*—Albert Gagliardi

(57) ABSTRACT

A high voltage distribution system and method for use with a cathode of a radiographic sensor device of a radiographic imaging apparatus are provided. The distribution system includes an insulated conductor formed on a first detector portion of the radiographic sensor device and communicating a high voltage to the cathode. The distribution system further includes an intermediate conduction portion communicating with the insulated conductor. The intermediate conduction portion includes a contact surface. The distribution system further includes a interconnect extending from a second portion of the radiographic sensor device. The separable interconnect communicates with an electrical voltage source and is positioned to come into contact with the intermediate conduction portion when the first detector portion of the radiographic sensor device is assembled to the second signal processing portion.

10 Claims, 1 Drawing Sheet

HIGH VOLTAGE DISTRIBUTION FOR A RADIOGRAPHIC SENSOR DEVICE

BACKGROUND OF THE INVENTION

1. Field of the Invention

The present invention relates generally to electrical power supply distribution, and more particularly to a high voltage distribution system for a radiographic sensor device such as a solid state gamma radiation imaging detector.

2. Description of the Background Art

Radiographic imaging is the detection of radiation from a distributed radiation field in order to form an image. By detecting the amount of radiation emanating from a test subject, the resultant image may give a representative view of the structure of the test subject.

Radiographic imaging typically employs gamma rays. Gamma rays are a form of radiation that is emitted by excited atomic nuclei during the process of passing to a lower excitation state. Gamma radiation is commonly used for medical imaging, and is capable of passing through soft tissue and bone. Gamma radiation may be provided by a radiopharmaceutical, such as thallium or technetium, for example, that is administered to the patient. The radiopharmaceutical travels through the patient's body and may be chosen to be absorbed or retained by an organ of interest. The radiopharmaceutical generates a predictable emission of gamma rays through the patient's body that can be detected and used to create an image.

A radiographic imaging device may be used to detect radiation emanating from the patient and may be used to form an image or images for viewing and diagnosis. Conventional gamma cameras utilize a scintillation crystal (usually made of sodium iodide) which absorbs the gamma photon emissions and emits light photons (or light events) in response to the gamma absorption. An array of photodetectors, such as photomultiplier tubes, is positioned adjacent to the crystal. The photomultiplier tubes receive the light photons from the crystal and produce electrical signals having amplitudes corresponding to the amount of light photons received. The electrical signals from the photomultiplier tubes are applied to position computing circuitry, wherein the location of the light event is determined, and the event location is then stored in a memory, from which an image of the radiation field can be displayed or printed.

Also known in the art are solid-state nuclear imaging cameras, see, e.g., U.S. Pat. Nos. 4,292,645 and 5,132,542. Such cameras use solid-state or semiconductor detector arrays in place of the scintillation crystal and photomultiplier tubes. In a solid-state camera, gamma rays are absorbed in a semiconductor material, creating electron-hole pairs in the semiconductor material. A bias voltage across the semiconductor detector causes the electrons and holes to form an electric current through the semiconductor material. The currents are converted by associated circuitry into electrical signals, which are processed to determine the location and magnitude of the gamma ray absorption event. While solid-state cameras offer potential benefits over the conventional scintillation crystal cameras in terms of reduced weight, improved resolution, improved uniformity, and increased imaging area, the use of such cameras has presented its own set of problems. In particular, early solid-state detectors made of germanium had to be cryogenically cooled to achieve acceptable performance.

Semiconductor detectors made of cadmium zinc telluride (CZT) have recently been proposed for use in solid-state gamma cameras. Such detectors may be operated at room temperature.

A number of radiographic sensor device modules may be tiled in an array to form a detector head. The detector head may be formed such that the radiographic sensor modules are individually detachable for maintenance, adjustment, etc.

The electrical signals generated by each component radiographic sensor device must be communicated to a processor or other device for interpretation, manipulation, and storage. Therefore, each radiographic sensor device must include a wiring harness to communicate the electrical signals to a processor of some sort. For the sensor array, the electrical connection is typically done through a pin grid array, having an array of pins corresponding to the sensor elements. However, the sensor elements generally output low voltages and are fairly simple to connect.

The electrical power supply provided to a cathode of each radiographic sensor device is typically a high negative voltage. The high voltage supplied to the cathode is used to control the current induced in the semiconductor material as a result of gamma interaction. Typically, the electrical power has been provided in the prior art by simple wire or trace connections, such as for example, a metal cathode substrate layer formed on the detector and connected to an electrical supply by wires or cables.

In the prior art the electrical power supply connection to the cathode has been problematic. The electrical power voltage level may be relatively high. Therefore, the prior art conductor connecting the cathode to an electrical power supply must be relatively large. In addition, for purposes of maintenance and repair, it is desirable that individual radiographic sensor devices be capable of being disconnected and reconnected without the necessity of disassembling the entire detector array. It is imperative that this be accomplished without compromising the electrical connection. Therefore, the electrical power supply path must be capable of self-alignment and a guaranteed contact.

What is needed, therefore, are improvements in high voltage distribution for solid-state radiographic detector devices.

SUMMARY OF THE INVENTION

An electrical power distribution system adapted for use with a cathode of a radiographic sensor device of a radiographic imaging device is provided according to the invention. The distribution system comprises an insulated conductor formed on a first detector portion of the radiographic imaging device and communicating electrical power to the cathode. The distribution system further comprises an intermediate conduction portion communicating with the insulated conductor. The intermediate conduction portion includes a contact surface. The distribution system further comprises a separable interconnect extending from a second detector portion of the radiographic imaging device. The separable interconnect communicates with an electrical power source and is positioned to come into contact with the intermediate conduction portion when the first detector portion of the radiographic imaging device is assembled to the second detector portion.

A method of providing electrical power to a cathode of a radiographic sensor device of a radiographic imaging apparatus is provided according to the invention. The method comprises the step of providing an insulated conductor on a first detector portion of the radiographic sensor device. The insulated conductor communicates electrical power to the cathode. The method further comprises the step of providing an intermediate conduction portion communicating with the insulated conductor. The intermediate conduction portion includes a contact surface. The method further comprises the step of providing a separable interconnect extending from a second detector portion of the radiographic imaging device. The separable interconnect communicates with an electrical power source and is positioned to come into contact with the intermediate conduction portion when the first detector portion is assembled to the second detector portion. When the first detector portion of the radiographic sensor device is assembled to the second detector portion, the separable interconnect removably contacts the intermediate conduction portion and conducts electrical power to the intermediate conduction portion and therefore to the insulated conductor and the cathode.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
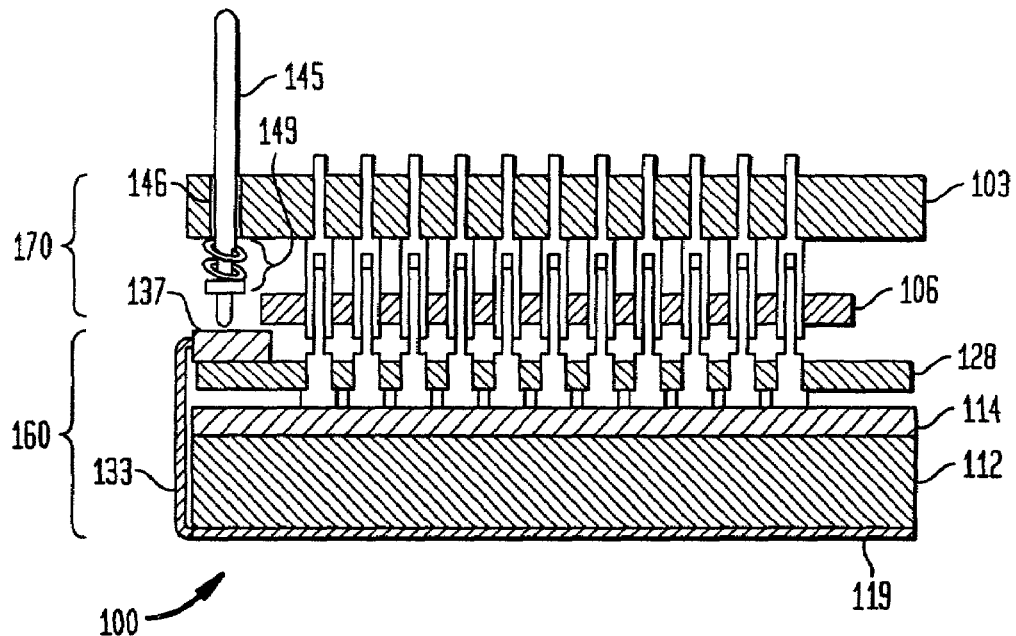
FIG. 1 shows an electrical power distribution system for a radiographic sensor device.

FIG. 1 shows a high voltage distribution system for a radiographic sensor device 100. The high voltage distribution system includes a semiconductor detector 112 (such as CZT), a PC board 103, a separable interconnect 145, an intermediate conduction portion 137, an-insulated conductor 133, and a cathode 119. In addition, the electrical power distribution system may include a pin grid array 128, a socket array 106 (which may also be a circuit board), an optional biasing device 149, and a signal board 114 (containing sensors and any associated circuitry).

For purposes of maintenance, repair, and even configuration or calibration, the radiographic sensor device may be separated into a first detector portion 160 and a second signal processing portion 170, as shown. The first detector portion 160 may be an imaging device component that incorporates the semiconductor detector 112, sensors, and any attendant components such as a pin grid array 128, etc.

The second signal processing portion 170 may comprise one or more circuit boards and one or more socket arrays to receive one or more associated first detector portions 160. The circuit boards and socket array shown may be a portion of an overall circuit board 103 and socket array 106 for receiving a plurality of first detector portions 160. The second signal processing portion 170 may therefore be part of a detector head of a radiographic imaging apparatus.

One or more first detector portions 160 may be assembled to the second signal processing portion 170 to form a completed detector head. When assembled, one or more first detector portions mate with the second signal processing portion 170 (and an associated pin grid array 128 mates with a corresponding portion of the socket array 106).

The separable interconnect 145 extends from the second signal processing portion 170 (and with respect to the circuit board 103). Therefore, when assembled, the separable interconnect 145 contacts and is biased against the intermediate conduction portion 137. The separable interconnect 145 therefore maintains physical and electrical contact with the intermediate conduction portion 137 and electrical power is conducted from the second signal processing portion 170 to the intermediate conduction portion 137, the insulated conductor 133, and ultimately to the cathode 119.

The separable interconnect 145 provides a connectorless mechanical separability and a mechanical flexibility. Therefore, the radiographic sensor device 100 is relatively insensitive to misalignment, whereby the first detector portion 160 may be installed on the second signal processing portion 170 without undue concern for maintaining a proper alignment of the separable interconnect 145. This results in a radiographic detector that is easier to assemble, easier to maintain, and requires less operator attention. Furthermore, a higher level of accuracy and reliability may be achieved due to the reliable electrical power distribution according to the invention.

In one embodiment, the separable interconnect 145 is deformable. Therefore, the assembly of the detector head causes the separable interconnect 145 to deform when it contacts the intermediate conduction portion 137. The deformation of the separable interconnect 145 creates a biasing force that keeps the separable interconnect 145 in contact with the intermediate conduction portion 137.

In another embodiment, the separable interconnect 145 is positioned in an aperture 146 in the circuit board 103. The separable interconnect 145 therefore is slidable within the circuit board 103 and accordingly is movable with respect to the second signal processing portion 170. The separable interconnect 145 is biased away from the second signal processing portion 170 by the biasing device 149. A biasing force is exerted by the biasing device 149 in order to displace the separable interconnect 145 outward and away from the second signal processing portion 170.

The biasing device 149 may be any type of device that creates a biasing force. The biasing device 149 may be a spring, such as a coil or leaf spring. Alternatively, the separable interconnect 145 may be a bladder, diaphragm, or other biasing device. The separable interconnect 145 is therefore capable of maintaining an electrical connection by maintaining a bias force against the intermediate conduction portion 137.

The biasing device 149 is shown as being positioned on the underside of the circuit board 103, but may be located at any suitable position with respect to the separable interconnect 145.

The separable interconnect 145 according to the invention is advantageous in that it may allow the first detector portion 160 to move laterally by a first predetermined distance with respect to the second signal processing portion 170, without losing electrical connection. The first predetermined distance is substantially the surface area of the intermediate conduction portion 137. In addition, the separable interconnect 145 is advantageous in that it may allow the first detector portion 160 to move a second predetermined distance with respect to the second signal processing portion 170. The second predetermined distance is substantially a range of travel of the separable interconnect 145 (controlled by the biasing device 149 or by the deformation properties of the separable interconnect 145), while maintaining contact with the intermediate conduction portion 137.

Figure 2:
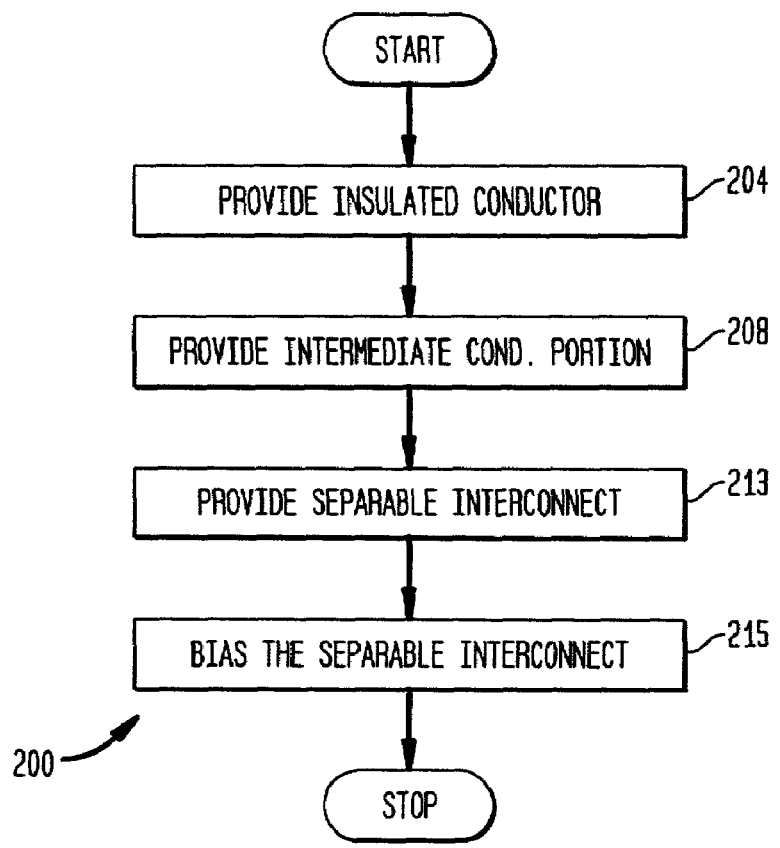
FIG. 2 is a flow chart of one method embodiment for providing electrical power to a cathode of a radiographic sensor device.

FIG. 2 is a flow chart 200 of one method embodiment for providing electrical power to a cathode of a radiographic sensor device. In step 204, an insulated conductor is provided, with the insulated conductor being in electrical communication with the cathode.

In step 208, an intermediate conduction portion is provided, with the intermediate conduction portion communicating with the insulated conductor. The intermediate conduction portion includes a contact surface suitable for mechanical and electrical contact with a separable interconnect. The insulated conductor and the intermediate conduction portion are formed on a first detector portion that may be removably assembled to a detector head of a radiographic imaging device.

In step 213, a separable interconnect is provided. The separable interconnect extends from the second signal processing portion. The separable interconnect may be deformable in order to maintain a contact pressure against the first detector portion when assembled to the first detector portion. Alternatively, the separable interconnect may movably extend from the second signal processing portion and be movable with respect to the second signal processing portion. The separable interconnect communicates with an electrical power source (not shown) and is positioned so as to come into contact with the intermediate conduction portion when the first detector portion is assembled to the second signal processing portion.

In step 215, the separable interconnect is biased away from the second detection portion. The biasing may be performed by deforming the separable interconnect when assembling the first detector portion to the second signal processing portion. Alternatively, the biasing may be performed by a biasing device communicating with the separable interconnect.

Therefore, when the first detector portion is assembled to the second signal processing portion, the separable interconnect removably contacts the intermediate conduction portion. As a result, the separable interconnect provides electrical power to the intermediate conduction portion, to the insulated conductor, and to the cathode (i.e., to the first detector portion). In this manner, electrical power, such as a high negative voltage, may be provided to the radiographic sensor device, while providing an interconnect that is substantially independent of alignment and is relatively compact.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A solid-state radiographic sensor device, comprising:
   a first detector portion, including
      a solid-state detector having an anode at a first surface thereof and a cathode at a second surface opposite said first surface,
      associated detector circuitry for developing electrical signals in response to radiation detection events in said solid-state detector, said detector circuitry having at least one surface area suitable for accommodating an electrical contact connection point,
      a high-voltage contact point provided on said at least one surface,
      an insulated conductor electrically coupled at one end thereof to said high-voltage contact point and at another end thereof to said cathode, and
      a signal connection interface; and
   a second signal processing portion connected to said first detector portion via said signal connection interface, including
      signal processing circuitry that receives signals from said associated detector circuitry via said signal connection interface, and
      a separable high-voltage interconnect coupled at one end thereof to a voltage source, and extending from said second signal processing portion so as to make contact with said high-voltage contact point upon connection of said second signal processing portion with said first detector portion, to provide a voltage to said cathode sufficient to properly bias said cathode for proper operation of said sensor device.

2. The solid-state radiographic sensor device of claim 1, further including a contact biasing device for biasing said separable high-voltage interconnect against said high-voltage contact point upon connection of said second signal processing portion with said first detector portion.

3. The solid-state radiographic sensor device of claim 1, wherein said separable high-voltage interconnect extends from said second signal processing portion in such manner so as to be movable with respect to a plane of said second signal processing portion.

4. The solid-state radiographic sensor device of claim 2, wherein said contact biasing device for biasing said separable high-voltage interconnect against said high-voltage contact point comprises a spring.

5. The solid-state radiographic sensor device of claim 1, wherein said high-voltage contact point comprises a metallic pad.

6. A method of providing a high voltage to a cathode of a solid-state detector of a radiographic sensor device, comprising the steps of:
   providing a high-voltage contact point on a surface of a first detector portion of said radiographic sensor device,
   providing an insulated conductor on said solid-state detector that electrically couples said high-voltage contact point to said cathode,
   providing an elongated high-voltage interconnect that extends from a surface of a second signal processing portion of said radiographic sensor device so as to make electrical contact with said high-voltage contact point upon connection of said first detector portion to said second signal processing portion in a manner that does not require precise alignment of said interconnect to said high-voltage contact point.

7. The method of claim 6, further comprising the step of biasing said elongated high-voltage interconnect in a direction away from said second signal processing portion.

8. The method of claim 7, wherein said step of biasing comprises the step of providing a contact biasing device for biasing said separable high-voltage interconnect against said high-voltage contact point.

9. The method of claim 8, wherein said contact biasing device comprises a spring.

10. The method of claim 6, wherein said step of providing a high-voltage contact point comprises the step of providing a metallic pad.

* * * * *